United States Patent
McGraw et al.

(10) Patent No.: US 12,157,354 B2
(45) Date of Patent: *Dec. 3, 2024

(54) VEHICLE DOOR AND WINDOW ARRANGEMENT

(71) Applicant: Oshkosh Corporation, Oshkosh, WI (US)

(72) Inventors: Dave McGraw, Oshkosh, WI (US); Andrew Drach, Oshkosh, WI (US); Paul Schmidt, Oshkosh, WI (US); Jeffrey Elliott, Oshkosh, WI (US); Jacob Beenen, Oshkosh, WI (US); Mohit Nagallapuram, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/378,046

(22) Filed: Oct. 9, 2023

(65) Prior Publication Data

US 2024/0034131 A1    Feb. 1, 2024

Related U.S. Application Data

(63) Continuation of application No. 18/118,427, filed on Mar. 7, 2023, now Pat. No. 11,813,930, which is a
(Continued)

(51) Int. Cl.
*B60J 5/04*    (2006.01)
*B60J 1/00*    (2006.01)
(Continued)

(52) U.S. Cl.
CPC ............ *B60J 5/0463* (2013.01); *B60J 1/007* (2013.01); *B60J 1/16* (2013.01); *B60J 5/047* (2013.01); *B60J 5/06* (2013.01)

(58) Field of Classification Search
None
See application file for complete search history.

(56) References Cited

U.S. PATENT DOCUMENTS 4,126,202 A * 11/1978 Hern ................. B60K 35/00
                                                  180/90
4,917,433 A *  4/1990 Tomforde ........... B60J 5/0455
                                                  296/202

(Continued)

FOREIGN PATENT DOCUMENTS

JP       59-073322       4/1984

OTHER PUBLICATIONS

Mariage, Duane, "Replace the rear cargo door roller track on an LLV postal truck," WonderHowTo.com, Sep. 12, 2010, retrieved from internet on Aug. 25, 2021, URL: https://diy-auto-repair.wonderhowto.com/how-to/replace-rear-cargo-door-roller-track-llv-postal-truck-396549/, 5 pages.

(Continued)

*Primary Examiner* — Joseph D. Pape
(74) *Attorney, Agent, or Firm* — Foley & Lardner LLP

(57) ABSTRACT

A door includes an inner wall, an outer wall, and a window assembly including a window. The inner wall is configured to engage with a cab of a vehicle. The outer wall is coupled to the inner wall and spaced apart from the inner wall to form an interior cavity. The door is configured to move between a closed position in which the inner wall is engaged with the cab and an open position in which the inner wall is separated from the cab. In the closed position, at least a portion of the interior cavity is configured to be disposed outboard from the cab in a lateral direction. The window is slidably engaged to the door and configured to move between an
(Continued)

extended position and a retracted position. In the retracted position, the window is at least partially disposed in the portion of the interior cavity.

17 Claims, 11 Drawing Sheets

Related U.S. Application Data continuation of application No. 17/890,675, filed on Aug. 18, 2022, now abandoned, which is a continuation of application No. 17/152,957, filed on Jan. 20, 2021, which is a continuation of application No. 16/426,678, filed on May 30, 2019, now abandoned.

(60) Provisional application No. 62/678,988, filed on May 31, 2018.

(51) Int. Cl.
  B60J 1/16 (2006.01)
  B60J 5/06 (2006.01)

(56) References Cited

U.S. PATENT DOCUMENTS

| | | | |
|---|---|---|---|
| 5,538,274 A | 7/1996 | Schmitz et al. | |
| 5,697,741 A | 12/1997 | Harris et al. | |
| 5,779,300 A | 7/1998 | McNeilus et al. | |
| 5,829,946 A | 11/1998 | McNeilus et al. | |
| 5,931,628 A | 8/1999 | Christenson | |
| 5,979,115 A * | 11/1999 | Szerdahelyi | B60J 5/0416 296/146.7 |
| 6,290,450 B1 | 9/2001 | Humphries et al. | |
| 6,299,236 B1 | 10/2001 | Praud et al. | |
| 6,485,079 B1 | 11/2002 | Brown et al. | |
| 6,527,495 B2 | 3/2003 | Humphries et al. | |
| 6,666,491 B2 | 12/2003 | Schrafel | |
| 6,918,721 B2 | 7/2005 | Venton-Walters et al. | |
| 6,997,506 B2 | 2/2006 | Hecker | |
| 7,055,880 B2 | 6/2006 | Archer | |
| 7,073,847 B2 | 7/2006 | Morrow et al. | |
| 7,118,314 B2 | 10/2006 | Zhou et al. | |
| 7,264,305 B2 | 9/2007 | Kuriakose | |
| 7,370,904 B2 | 5/2008 | Wood et al. | |
| 7,517,005 B2 | 4/2009 | Kuriakose | |
| 7,621,580 B2 | 11/2009 | Randjelovic et al. | |
| 7,823,948 B2 | 11/2010 | Redman et al. | |
| 7,954,882 B2 | 6/2011 | Brummel et al. | |
| 8,152,216 B2 | 4/2012 | Howell et al. | |
| 8,376,439 B2 | 2/2013 | Kuriakose et al. | |
| 8,720,977 B2 * | 5/2014 | Nakamura | B60J 5/0413 49/502 |
| 8,794,886 B1 | 8/2014 | Nett et al. | |
| 8,967,699 B1 | 3/2015 | Richmond et al. | |
| 9,016,703 B2 | 4/2015 | Rowe et al. | |
| 9,045,014 B1 | 6/2015 | Verhoff et al. | |
| 9,174,686 B1 | 11/2015 | Messina et al. | |
| 9,366,507 B1 | 6/2016 | Richmond et al. | |
| 9,493,093 B2 | 11/2016 | Stingle et al. | |
| 9,656,640 B1 | 5/2017 | Verhoff et al. | |
| 9,707,869 B1 | 7/2017 | Messina et al. | |
| 9,738,186 B2 | 8/2017 | Krueger et al. | |
| 9,764,613 B2 | 9/2017 | Rowe et al. | |
| 2004/0217629 A1 | 11/2004 | Shioji et al. | |
| 2014/0252798 A1 | 9/2014 | Angelo | |

OTHER PUBLICATIONS

The Public Group, LLC, "Auction #1424328—1991 Chevy/Grumman 2WD Mail Truck," Public Surplus, Aug. 5, 2015, retrieved from the internet on Aug. 25, 2021, URL: https://www.publicsurplus.com/sms/auction/view?auc=1424328, 2 pages.

Youtube, screen captures from YouTube video clip entitled "LLVlog #1: I Just Bought A Mail Truck," uploaded on Apr. 20, 2021 by user "Postal Dog", URL: https://www.youtube.com/watch?v=y0LpZYUReQc, 6 pages.

Youtube, screen captures from YouTube video clip entitled "LLVlog #2: Day 1 Inspections, Maintenance," uploaded on Apr. 27, 2021 by user "Postal Dog", URL: https://www.youtube.com/watch?v=PJmaiwrrbxQ, 7 pages.

Youtube, screen captures from YouTube video clip entitled "Vehicle Tour: Post Office Delivery Truck," uploaded on Mar. 5, 2017 by user "GK7 DIY", URL: https://www.youtube.com/watch?v=9QfDdo4Wnql&t, 6 pages.

* cited by examiner

VEHICLE DOOR AND WINDOW ARRANGEMENT

CROSS-REFERENCE TO RELATED PATENT APPLICATIONS

The present application is a continuation of Ser. No. 18/118,427, filed Mar. 7, 2023, which is a continuation of U.S. patent application Ser. No. 17/890,675, filed Aug. 18, 2022, which is a continuation of U.S. patent application Ser. No. 17/152,957, filed Jan. 20, 2021, which is a continuation of U.S. patent application Ser. No. 16/426,678, filed May 30, 2019, which claims the benefit of and priority to U.S. Provisional Patent Application No. 62/678,988, filed May 31, 2018, which are incorporated herein by reference in their entirety.

BACKGROUND

Mail and package delivery vehicles transport a variety of cargo from post-office and shipping centers to residences and businesses. These delivery vehicles are configured to carry large quantities of material to reduce the number of trips between the post-office and various municipalities. The delivery vehicles are also configured so that the packages may be quickly loaded at the post-office or shipping center and are readily accessible to an operator during delivery. During a typical route, an operator may need to access mail boxes from within the vehicle to drop off smaller mail items, enter and exit the vehicle repeatedly to drop off larger packages, and access the cargo area to quickly locate packages for drop-off.

SUMMARY

An embodiment relates to a door including an inner wall, an outer wall, and a window assembly. The inner wall is configured to engage with a cab of a vehicle. The outer wall is coupled to the inner wall and spaced apart from the inner wall to form an interior cavity. The door is configured to move between a closed position in which the inner wall is engaged with the cab and an open position in which the inner wall is separated from the cab. In the closed position, at least a portion of the interior cavity is configured to be disposed outboard from the cab in a lateral direction. The window assembly includes a window. The window is slidably engaged to the door and configured to move between an extended position and a retracted position. In the retracted position, the window is at least partially disposed in the portion of the interior cavity.
In any of the above embodiments, the door may be configured to be received within an opening of the cab. A width of the window in a longitudinal direction may be greater than a width of the opening proximate to at least one of a lower edge of the opening or a floor of the cab.

Another embodiment relates to a vehicle. The vehicle includes a chassis, a vehicle body, and a door. The vehicle body includes a cab disposed on a forward end of the chassis. The door is coupled to the cab. The door includes an inner wall, an outer wall, and a window assembly. The outer wall is coupled to the inner wall and is spaced apart from the inner wall to form an interior cavity. The door is configured to move between a closed position in which the inner wall is engaged with the cab and an open position in which the inner wall is separated from the cab. In the closed position at least a portion of the interior cavity is disposed outboard from the cab in a lateral direction. The window assembly includes a window. The window is slidably engaged to the door and is configured to move been an extended position and a retracted position. In the retracted position, the window is at least partially disposed in the portion of the interior cavity.

In some embodiments, the cab further includes an opening that receives the door in the closed position. A width of the window in a longitudinal direction may be greater than a width of the opening proximate to at least one of a lower edge of the opening or a floor of the cab.

Another embodiment relates to a vehicle. The vehicle includes a chassis, a vehicle body, and a door. The vehicle body includes a cab disposed on a forward end of the chassis. The door is coupled to the cab. The door includes a window assembly having a first track, a second track, and a window. The first track is coupled to the door and disposed proximate to a rear edge of the door. The first track extends in a direction that is substantially parallel with the rear edge. The second track is also coupled to the door. The second track is oriented parallel to the first track and is disposed proximate to a forward edge of the door. The window is slidably engaged to both the first track and the second track. The window is configured to move between an extended position and a retracted position. In the extended position, the window is disposed at a first lateral position proximate to an upper end of the door. In the retracted position, the window is disposed at a second lateral position proximate to a lower end of the door. The second lateral position is farther from a longitudinal axis of the vehicle than an outer surface of the cab.

In some embodiments, the second lateral position is farther from the longitudinal axis of the vehicle than the first lateral position. In some embodiments, the cab further includes an opening in which the door is received. A width of the door in a longitudinal direction may be greater proximate to the cutout than at a lower end of the door.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 2:
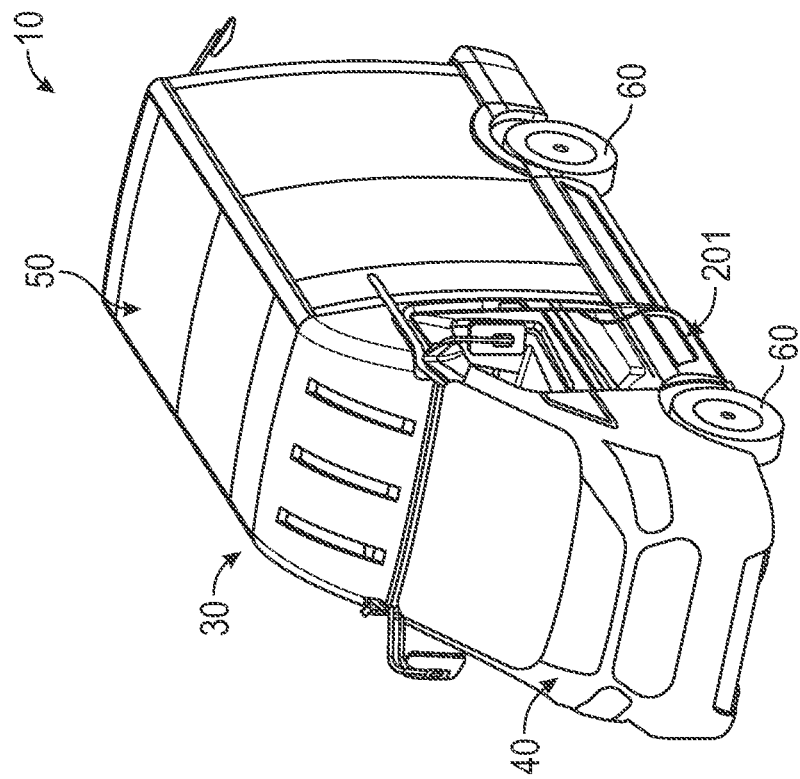
FIGS. 1-2 are perspective views of a mail and package delivery vehicle, according to an illustrative embodiment.
Figure 1:
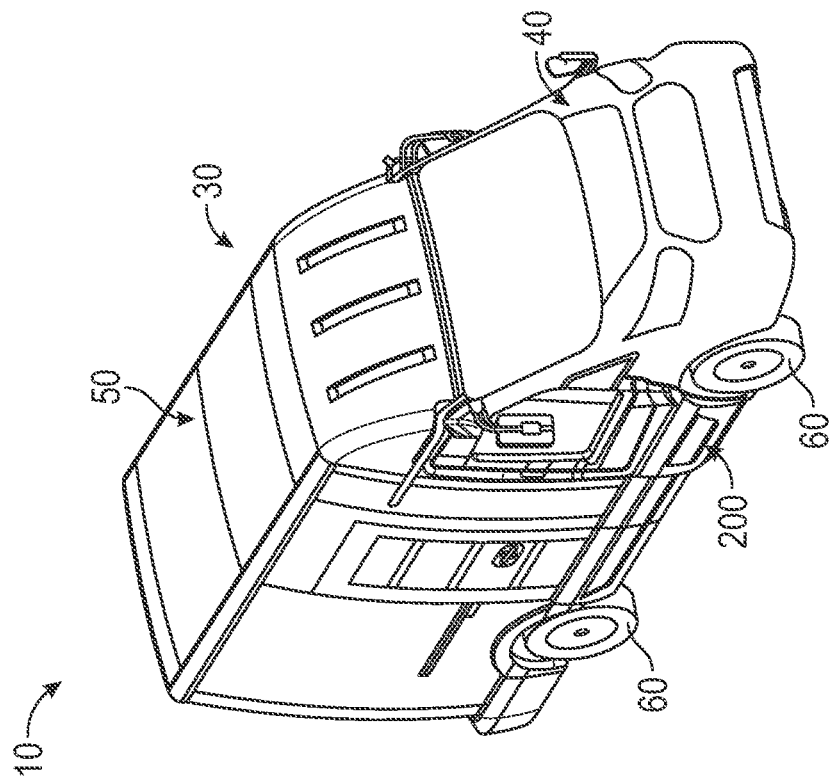

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

As shown in FIGS. 1-4, a mail and delivery vehicle includes a frame and a vehicle body mounted to the frame. The vehicle body further includes a cab toward the front of the delivery vehicle that is used to accommodate one or more vehicle operators. The cab may be a third-party designed vehicle cab (e.g., for a commercial utility vehicle, truck, etc.) that is manufactured with hinged-type doors (e.g., doors that are hingedly connected to the cab and rotate away from the vehicle to permit user entry) on both the left side (e.g., driver's side) and right side (e.g., passenger side) of the delivery vehicle or another door type. In various embodiments, the cab of the delivery vehicle is modified to incorporate a set of sliding doors that are slidably engaged to the cab.

At least one door (e.g., cab door) of the delivery vehicle includes an enlarged window. The window is coupled to multiple slide rails contained within the door. As an operator opens the window (e.g., to a retracted position), the window moves along the slide rails in at least a partially lateral direction, away from the cab of the delivery vehicle. In a retracted position, the window is disposed outboard of a side wall of the cab and away from any structural members of the cab toward a lower end of the door. Among other benefits, this configuration accommodates a window size that has a greater width in a longitudinal direction (e.g., front-to-back of the delivery vehicle) than an opening in the cab where the door engages the delivery vehicle. The location of the window within the door in the retracted position minimizes the impact to the performance of the delivery vehicle (e.g., fuel economy due to increased drag, etc.). The details of the general depiction provided in FIGS. 1-4 will be more fully explained by reference to FIGS. 5-18.

According to the exemplary embodiment of FIGS. 1-4, a vehicle, shown as delivery vehicle 10 includes a chassis, shown as frame 20, and a vehicle body, shown as body 30 that is coupled to the frame 20. The body 30 of the delivery vehicle 10 includes a cab 40 coupled to a front end of the frame 20 and cargo body, shown as cargo box 50 coupled to a rear end of the frame 20. The cab 40 is configured to accommodate one or more occupants of the delivery vehicle 10. In an embodiment, the cab 40 is an enclosure that protects an occupant from environmental and road hazards. The cab 40 may include various components to facilitate operation of the delivery vehicle 10 by an operator. For example, the cab 40 may include an instrument panel that provides a user with diagnostic information about the delivery vehicle 10. The cab may also include control equipment (e.g., steering wheel, throttle and brake pedals, signals, etc.) associated with the delivery vehicle 10, which are contained within an interior space of the cab 40 for ready access by an operator. The delivery vehicle 10 also includes a prime mover, or engine, coupled to the frame 20 (e.g., at a position beneath the cab 40). The engine is configured to provide power to a plurality of tractive elements, shown as wheels 60, and/or other systems of the delivery vehicle 10 (e.g., a pneumatic system, a hydraulic system, etc.). The engine may be configured to utilize one or more of a variety of fuels (e.g., gasoline, diesel, bio-diesel, ethanol, natural gas, etc.), according to various embodiments. The engine may additionally or alternatively include one or more electric motors coupled to the frame 20 (e.g., a hybrid refuse vehicle, an electric refuse vehicle, etc.). The electric motors may consume electrical power from an on-board storage device (e.g., batteries, ultra-capacitors, etc.), from an on-board generator (e.g., an internal combustion engine, etc.), and/or from an external power source (e.g., overhead power lines, etc.) and provide power to the systems of the delivery vehicle 10.

Figure 3:
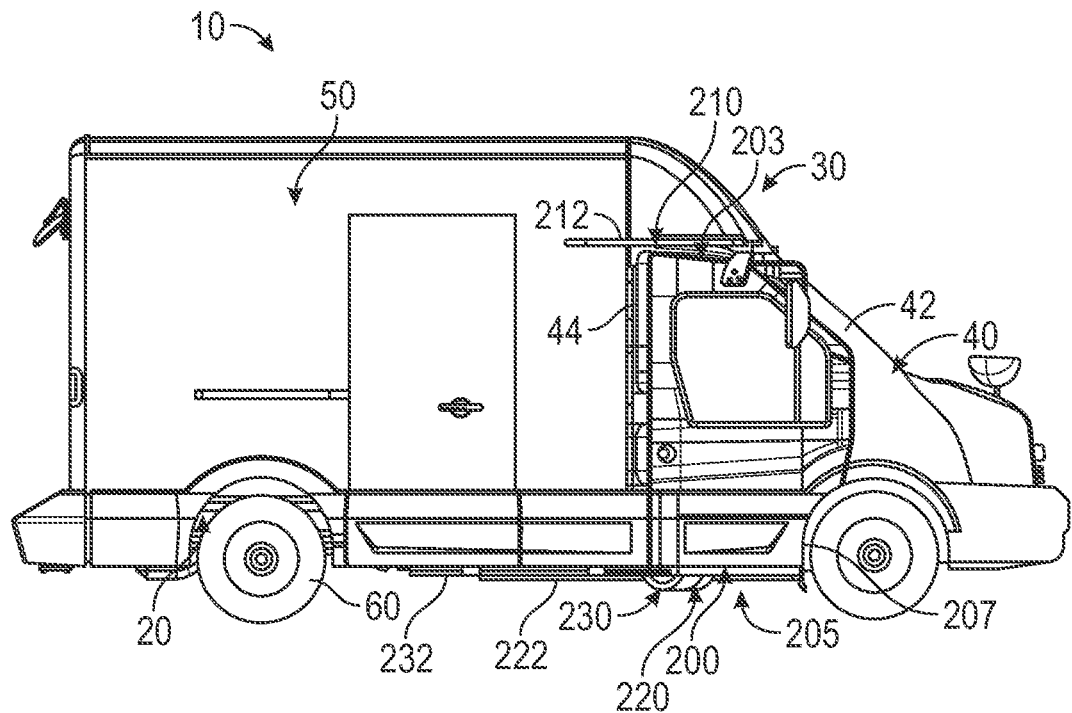
FIG. 3 is a right side view of the mail and package delivery vehicle of FIGS. 1-2.
Figure 4:
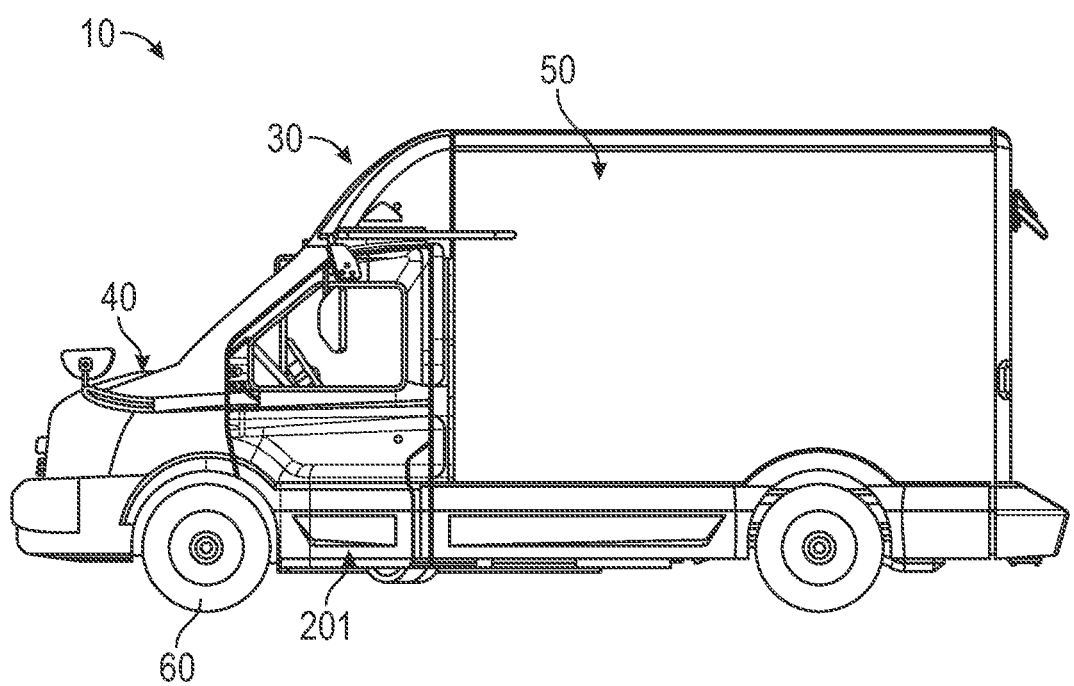
FIG. 4 is a left side view of the mail and package delivery vehicle of FIGS. 1-2.

The cab 40 of the delivery vehicle 10 includes one or more doors disposed proximate a side wall of the cab 40. In the illustrative embodiment of FIGS. 1-4, the cab 40 of the delivery vehicle 10 includes a sliding front door system configured to facilitate user entry and exit from the delivery vehicle 10. The sliding front door system includes at least one front sliding door. As shown in any of FIGS. 1-4, a front sliding door may be a right sliding door 200 coupled to a right side (e.g., passenger side as shown in FIG. 3) of the cab 40 of the delivery vehicle 10 or a left sliding door 201 coupled to a left side (e.g., driver side as shown in FIG. 4) of the cab 40 of the delivery vehicle 10. In some embodiments, the left sliding door 201 may be the same or similar to the right sliding door 200. In other embodiments, the left sliding door 201 and the right sliding door 200 may be different.

As shown in FIGS. 3, the sliding front door system for the right sliding door 200 includes a plurality of track assemblies configured to support the right sliding door 200 and to facilitate repositioning of the right sliding door 200 from an open position (in which a user may enter the cab 40, in which an interior surface of the right sliding door 200 is separated or spaced apart a distance from the cab 40 in a lateral direction) to a closed position (in which the user is prevented from entering or leaving the cab 40). Each of the track assemblies includes a track that extends in a substantially longitudinal direction (e.g., front-to-back of the delivery vehicle 10) to facilitate movement of the right sliding door 200 between a closed position, where the right sliding door 200 is positioned in between the A-pillar 42 and the B-pillar 44, and an open position, where at least a portion of the right sliding door 200 is positioned rearward of the B-pillar 44. A first track assembly, shown as upper track assembly 210, is disposed proximate to an upper end 203 of the right sliding door 200. A second track assembly, shown as forward track assembly 220, and a third track assembly, shown as rear track assembly 230, are both disposed proximate to a lower end 205 of the right sliding door 200. In an exemplary embodiment, the forward track assembly 220 is disposed proximate to a forward edge 207 of the right sliding door 200, while the rear track assembly 230 is disposed proximate to a rear edge 209 of the right sliding door 200. In other embodiments, the forward track assembly 220 and the rear track assembly 230 may be replaced by a single track assembly. The position of each of the upper track assembly 210, forward track assembly 220, and rear track assembly 230 may also be different in various exemplary embodiments. In some embodiments, the right sliding door 200 may be replaced by a hinged-type door with a similar structure to the right sliding door 200 but that is hingedly connected to the cab 40.

As shown in FIG. 3, the upper track assembly 210 includes an upper track 212 that is rigidly coupled (e.g., rigidly mounted, secured in position relative to) to both the cab 40 and a portion of the cargo box 50. Alternatively, the upper track 212 may be rigidly coupled to only one of the cab 40 and cargo box 50. In some embodiments, the upper track 212 is fastened to at least one of the cab 40 and the cargo box 50 using a plurality of screws, bolts, rivets or any other suitable fastener. In other embodiments, the upper track 212 is directly welded to at least one of the cab 40 and the cargo box 50. In the embodiment of FIG. 3, the upper track 212 is fastened to the cab 40 and the cargo box 50 using a series of bolts that interface with the upper track 212 through a corresponding one of a plurality of through-holes, which are centrally disposed along the length of the upper track 212.

Figure 5:
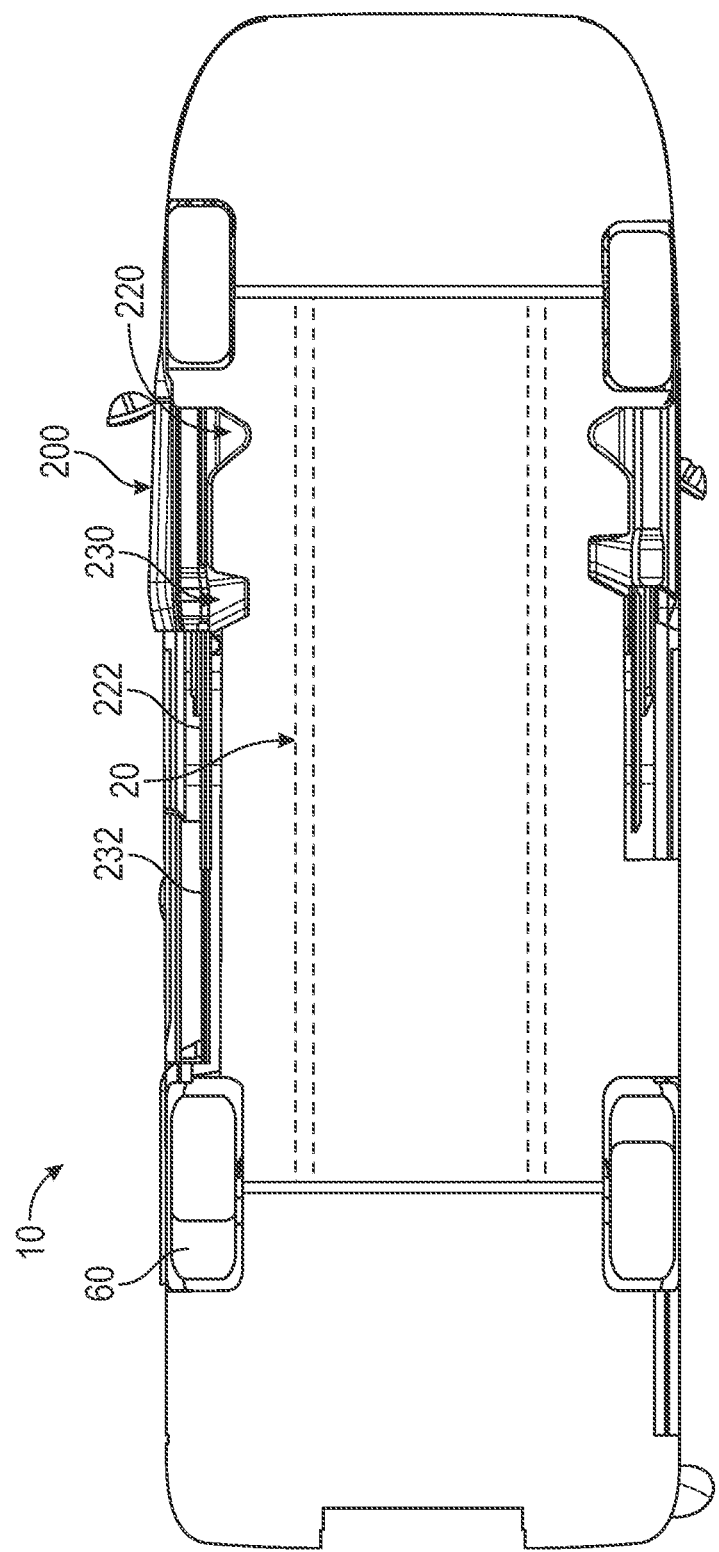
FIG. 5 is a bottom view of the mail and package delivery vehicle of FIGS. 1-2.

As shown in FIG. 5, both the forward track assembly 220 and the rear track assembly 230 are disposed beneath the cab 40. A forward track 222 of the forward track assembly and a rear track 232 of the rear track assembly 230 are rigidly coupled (e.g., rigidly mounted) to at least one of the cab 40 and the cargo box 50. In other embodiments, at least a portion of the forward track 222 or rear track 232 is rigidly coupled to the frame 20 of the delivery vehicle 10.

Figure 6:
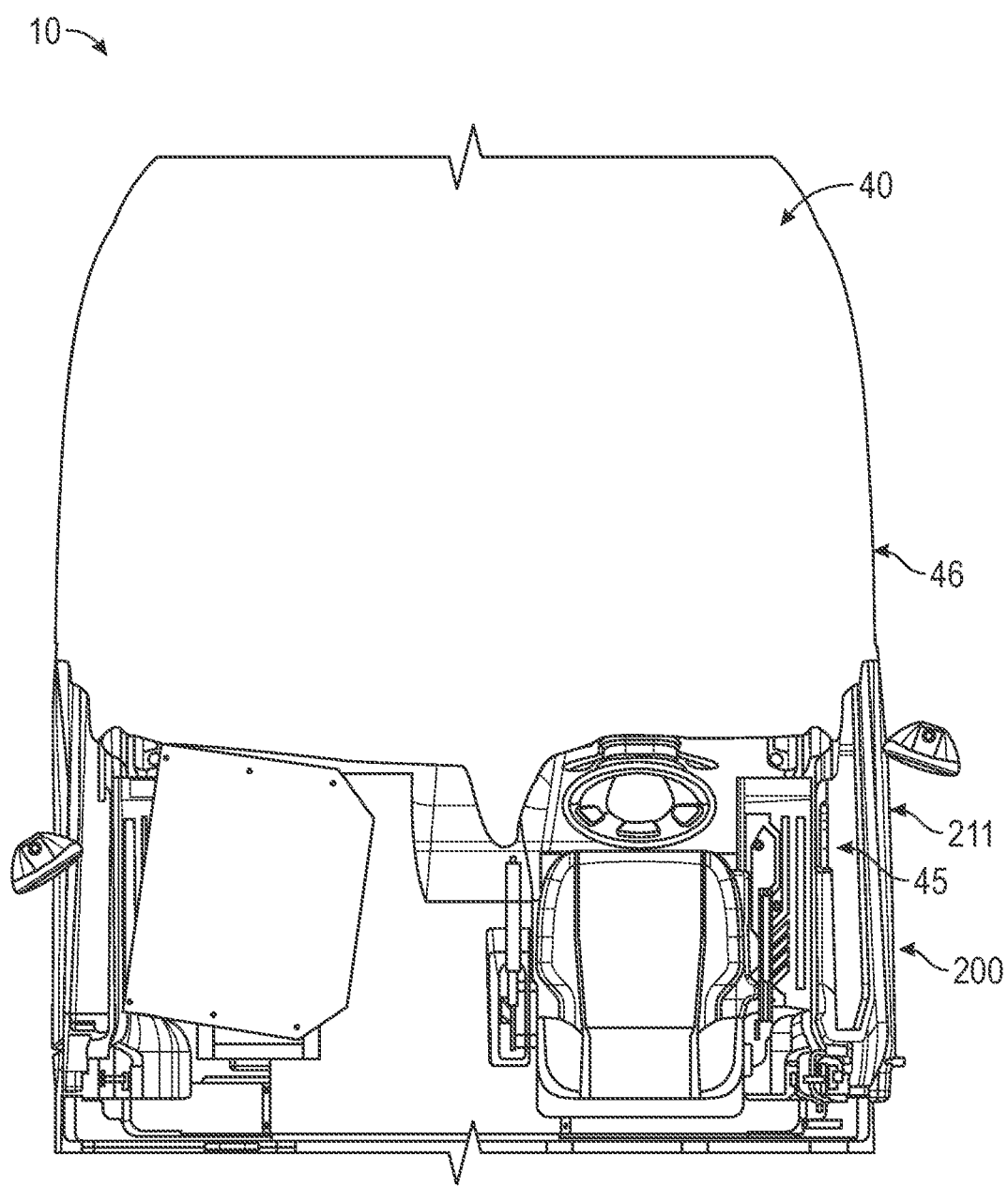
FIG. 6 is a top cross-sectional view of the mail and package delivery vehicle of FIGS. 1-2.

In the delivery vehicle 10 of FIGS. 1-4, the right sliding door 200 is configured to replace a hinged-type door assembly (e.g., doors hingedly disposed along a rear edge of the door that pivot to facilitate user entry to and exit from the delivery vehicle 10) typical of the kind used on commercial vehicle cabs. As shown in FIG. 6, the right sliding door 200 is configured to be inserted into a recessed area 45 on a side (e.g., side wall) of the cab 40 that is typically used to receive a hinged-type door assembly. Among other benefits, this configuration protects a driver or operator from environmental hazards (e.g., flying debris from other vehicles, weather, etc.) and reduces aerodynamic drag on the cab 40 while the delivery vehicle 10 is in motion.

Figure 7:
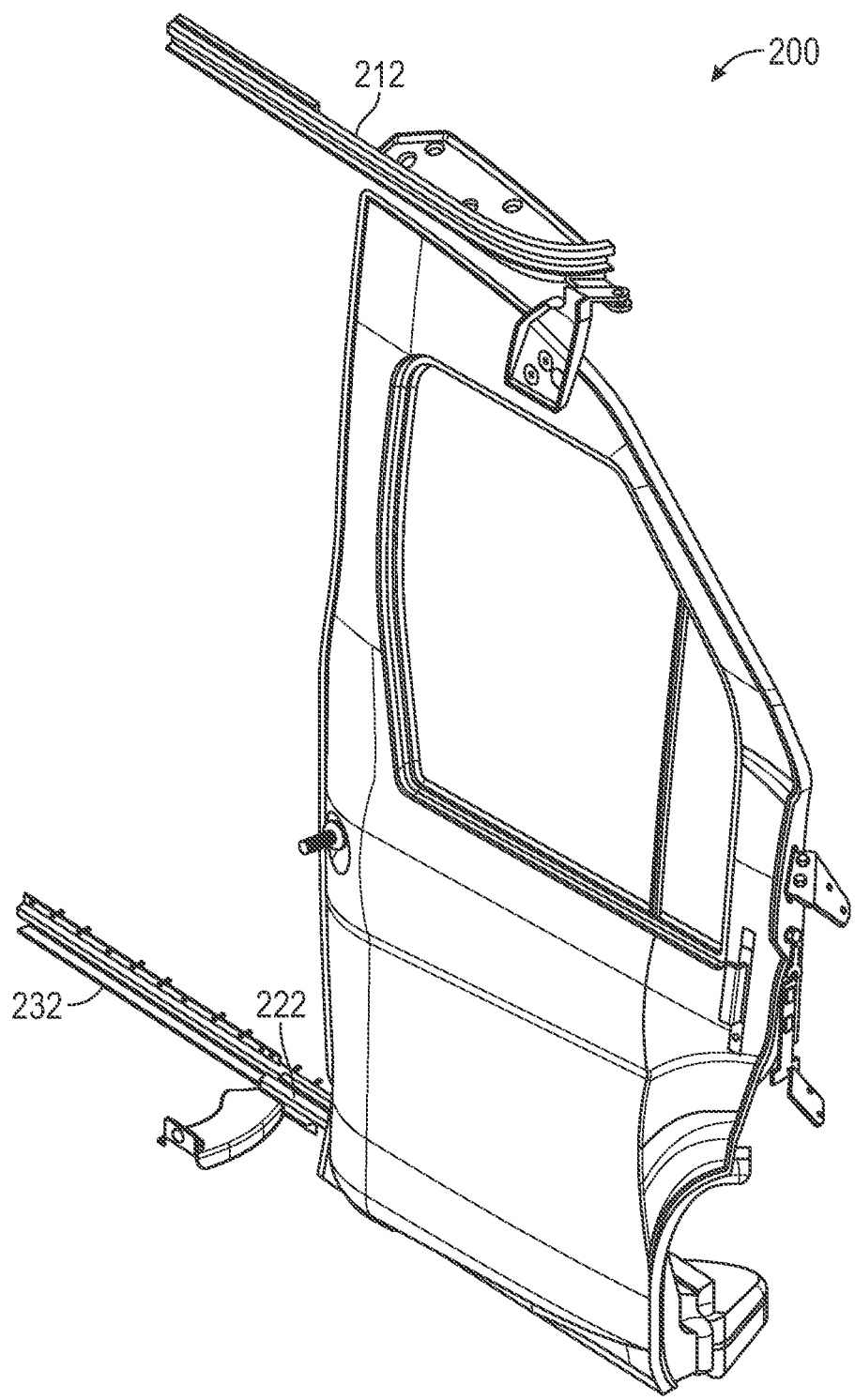
FIGS. 7-8 are perspective views of a right sliding door for the mail and package delivery vehicle of FIGS. 1-2.
Figure 8:
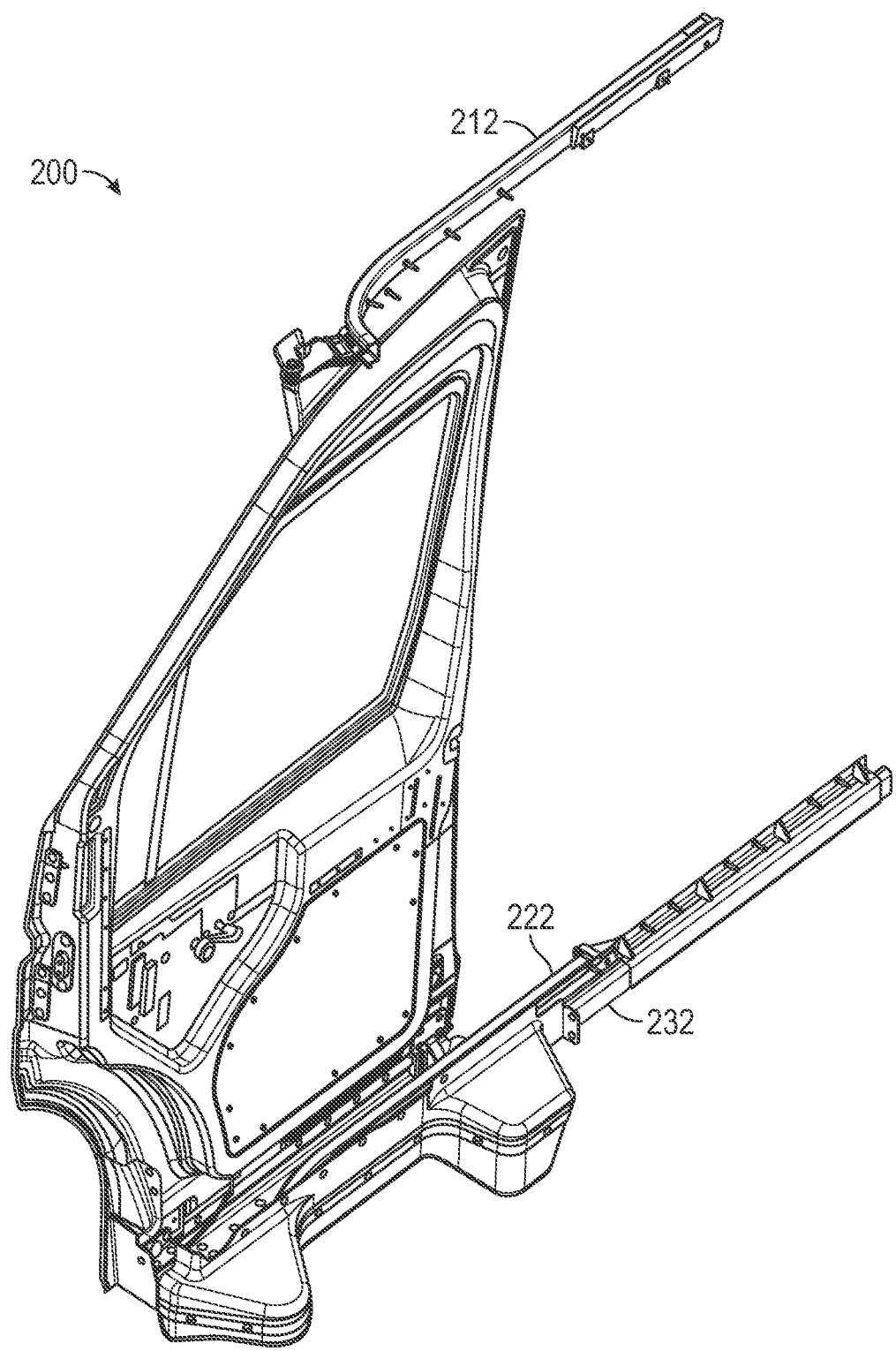
Figure 9:
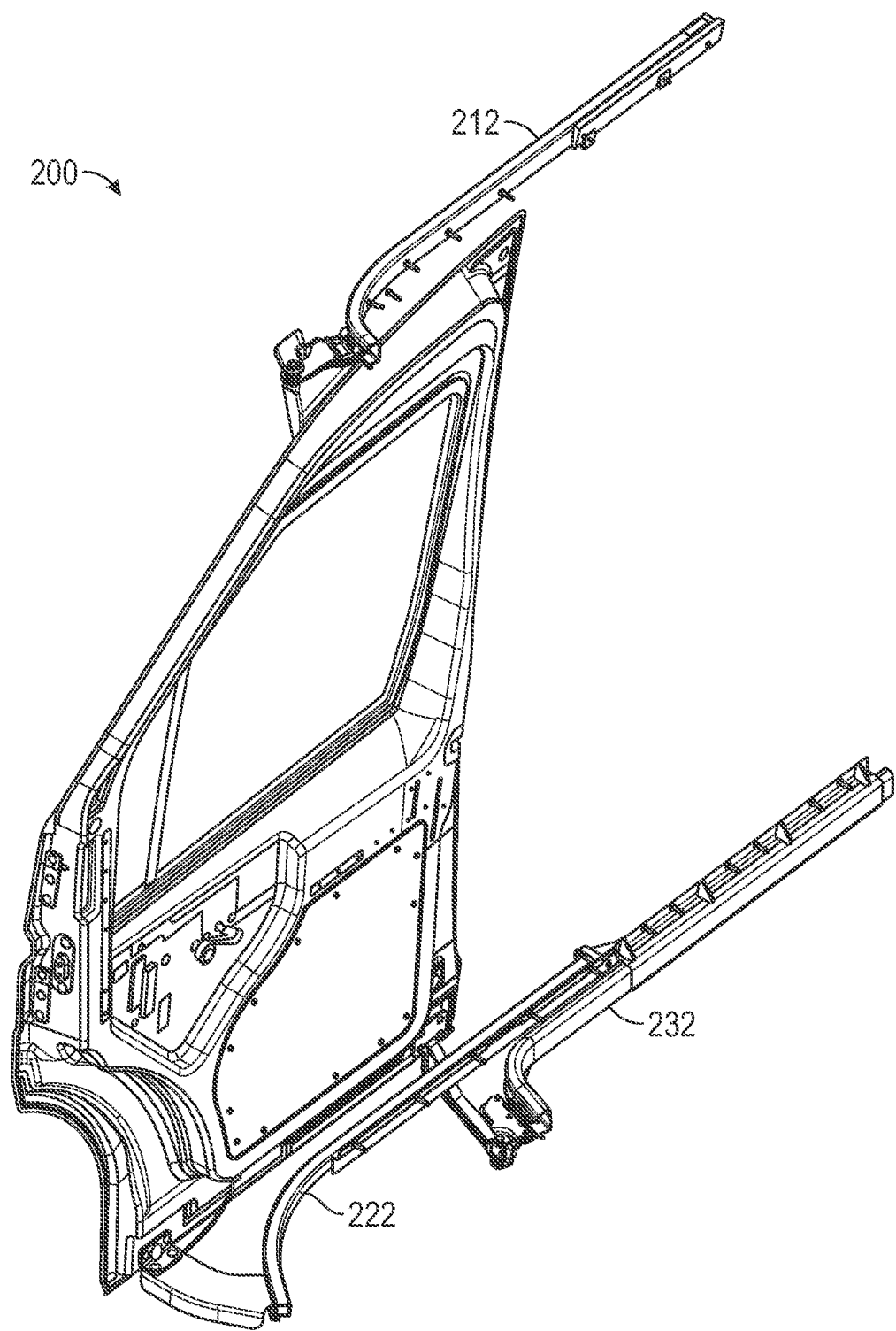
FIG. 9 is a reproduction of FIG. 8, with a set of track covers removed from tracks on the sliding door.

As shown in FIGS. 7-9, each of the upper track 212, the forward track 222, and the rear track 232 is curved inwardly along a first end of the track (e.g., toward the cab 40 of the delivery vehicle 10). Among other benefits, the curved track configuration allows the right sliding door 200 to nest within one of the recessed areas 45 (see FIG. 6) on either side of the cab 40 such that, in the closed position, an outer surface 211 of the right sliding door 200 is approximately coplanar with an outer surface 46 of the cab 40. In other embodiments, the door is a traditional hinged-type door that is pivotably connected to the cab 40 along a forward edge of the door or any other door type.

Figure 10:
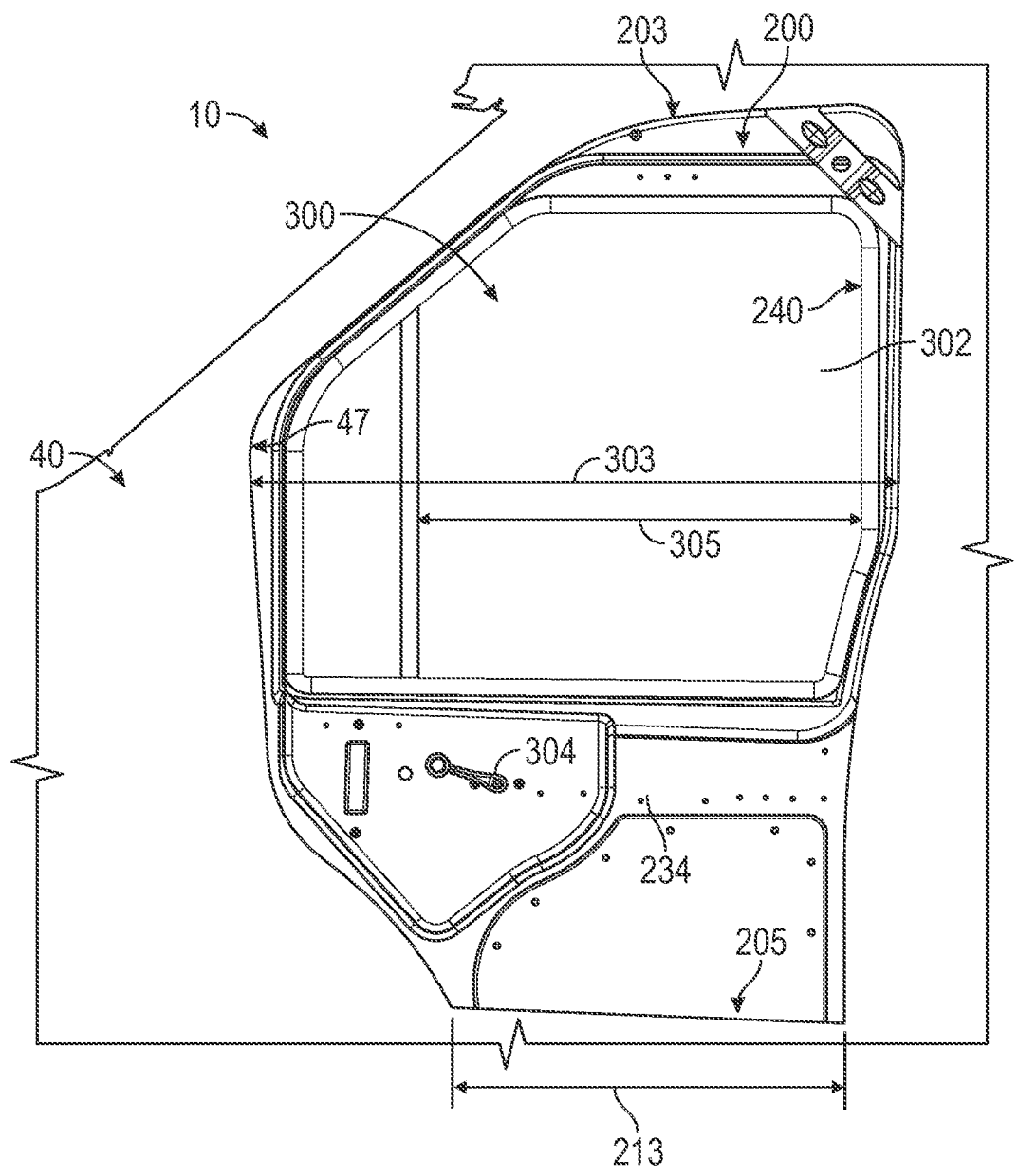
FIG. 10 is a left side view of a cab of the mail and package delivery vehicle of FIGS. 1-2, at a cross-section along a longitudinal axis of the vehicle.

As shown in FIG. 10, the delivery vehicle 10 includes a window assembly, shown as window assembly 300 disposed in the right sliding door 200. The window assembly 300 includes a window 302, and a control mechanism, shown as control lever 304. The control lever 304 is disposed proximate to an inner surface 234 of the right sliding door 200. In the delivery vehicle of FIG. 10, the position of the window 302 relative to the right sliding door 200 is controlled by manipulating the control lever 304 (e.g., manually by an occupant of the delivery vehicle 10). In some embodiments, the control lever 304 is a manual crank configured to interface with a support mechanism for the window assembly 300. In other embodiments, the control lever 304 is electrically connected to a control motor (e.g., an electric motor, etc.) for the window assembly 300, which raises or lowers the window 302 in response to a signal received from the control lever 304 (e.g., based on the position of the control lever 304).

As shown in FIG. 10, the right sliding door 200 is received within an opening, shown as door opening 47 of the cab 40 in the closed position. The right sliding door 200 is engaged with the door opening 47 in the closed position. The window 302 is disposed in a cutout 240 that is positioned centrally in an upper portion of the right sliding door 200, proximate to the upper end 203 of the right sliding door 200. A width 303 of the right sliding door 200 in a longitudinal direction (e.g., front to back of the delivery vehicle 10, left-to-right as shown in FIG. 10) is greater proximate to the cutout 240 than at the lower end 205 of the right sliding door 200, shown as lower width 213. The width 305 of the window 302 in a longitudinal direction (e.g., front-to-back of the delivery vehicle 10, left-to-right as shown in FIG. 10) is greater than a width 48 of the door opening 47 proximate to a lower edge of the door opening 47, and also proximate to a floor 49 of the cab 40 (a lower surface of an enclosed volume defined by the cab 40).

Figure 11:
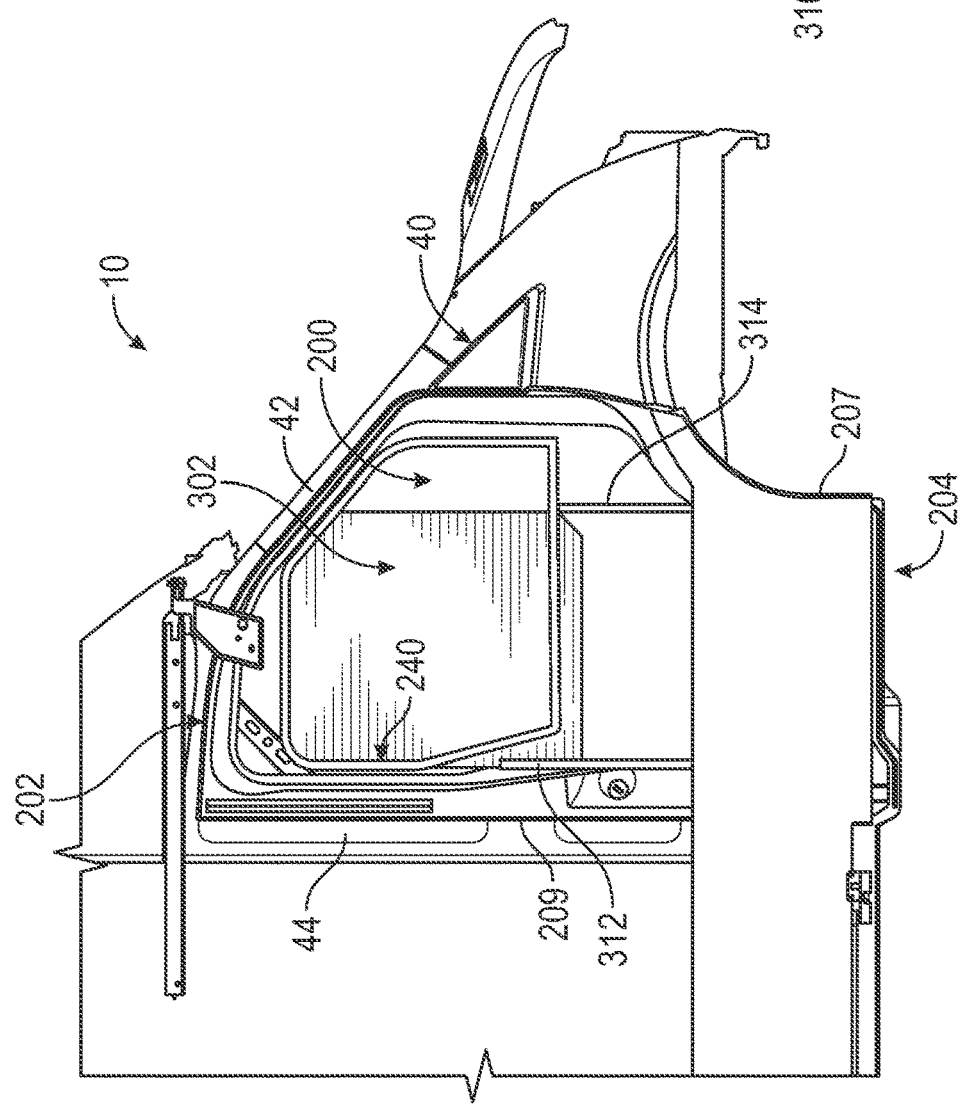
FIG. 11 is a right side view of a cab of the mail and delivery vehicle of FIGS. 1-2, with a window configured in an extended position, according to an illustrative embodiment.

FIG. 11 shows a side view of the right sliding door 200 configured with the window 302 in a closed position (in which the window 302 shields an occupant from an environment surrounding the delivery vehicle 10). In the closed position, as shown in FIG. 11, the window 302 is disposed within the cutout 240. The window 302 is coupled to the right sliding door 200 via a plurality of tracks, shown as first guide rail 312 and second guide rail 314. Each of the first guide rail 312 and the second guide rail 314 are contained substantially within an interior cavity 206 (see also FIG. 12) of the right sliding door 200 (e.g., an interior cavity below the cutout 240 and defined at least partially by an inner and outer wall of the right sliding door 200).

The window 302 is slidably engaged to the first guide rail 312 and the second guide rail 314. As shown in FIG. 11, the first guide rail 312 is disposed proximate to the rear edge 209 of the right sliding door 200 and the second guide rail 314 is disposed proximate to the forward edge 207 of the right sliding door 200. Each of the guide rails 312, 314 may be rigidly coupled (e.g., secured in position relative to) to an inner surface of the interior cavity 206 of the right sliding door 200 (e.g., using bolts, screws, a weld joint, etc.). As shown in FIG. 11, each of the first guide rail 312 and the second guide rail 314 extends vertically in a direction that is substantially parallel to one of the rear edge 209 and forward edge 207 of the right sliding door 200 when viewed from the right side of the delivery vehicle 10. In some embodiments, each of the first guide rail 312 and the second guide rail 314 extends only a fraction of a vertical height of the right sliding door 200.

Figure 12:
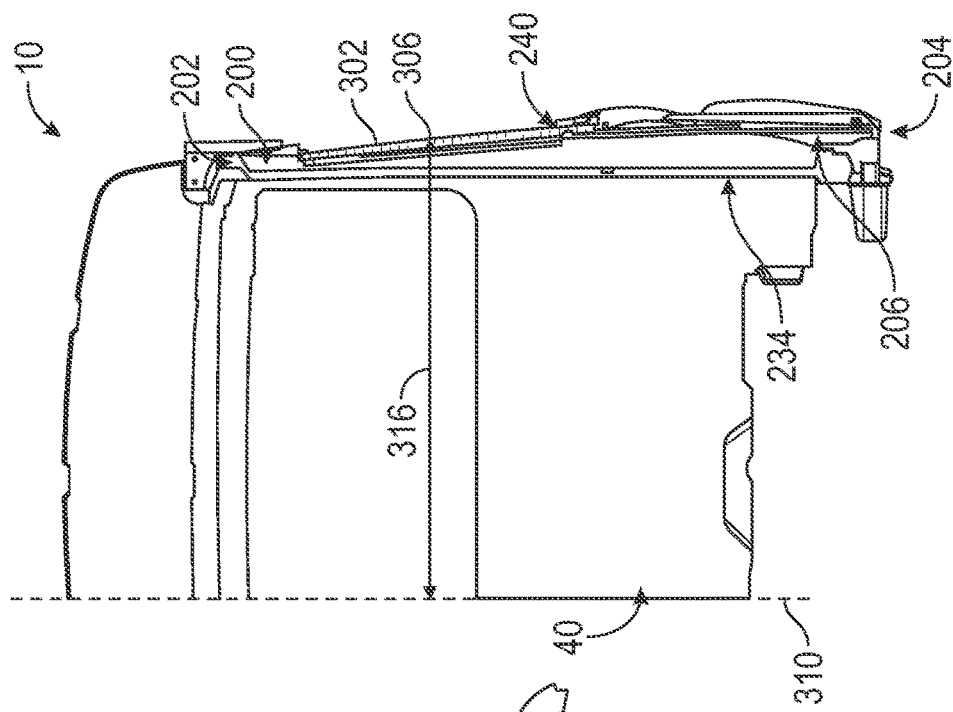
FIG. 12 is a rear cross-sectional view of the cab of FIG. 11.

As shown in FIGS. 11-12, each of the first guide rail 312 and the second guide rail 314 extends a distance between the cutout 240 and a lower edge 204 of the right sliding door 200. As shown in FIG. 11, both the guide rails 312, 314 terminate just before reaching the cutout 240, at which point the window 302 may engage with a second set of tracks or guides (not shown). A first track of the second set of tracks may be disposed proximate to the rear edge 209 of the right sliding door 200, while a second track of the second set of tracks may be disposed proximate to a forward edge 207 of the right sliding door 200. The first track may be alignable with the first guide rail 312 and configured to receive an edge (e.g., an aft or rear edge) of the window 302 as the window 302 travels toward a closed position. Similarly, the second track may be alignable with the second guide rail 314 and configured to receive an edge (e.g., a forward edge) of the window 302 as the window 302 travels toward a closed position. In other embodiments, the height of the first guide rail 312 and the second guide rail 314 may be different (e.g., the first guide rail 312 and the second guide rail 314 may extend at least partially past a lower edge of the cutout 240, etc.).

Figure 13:
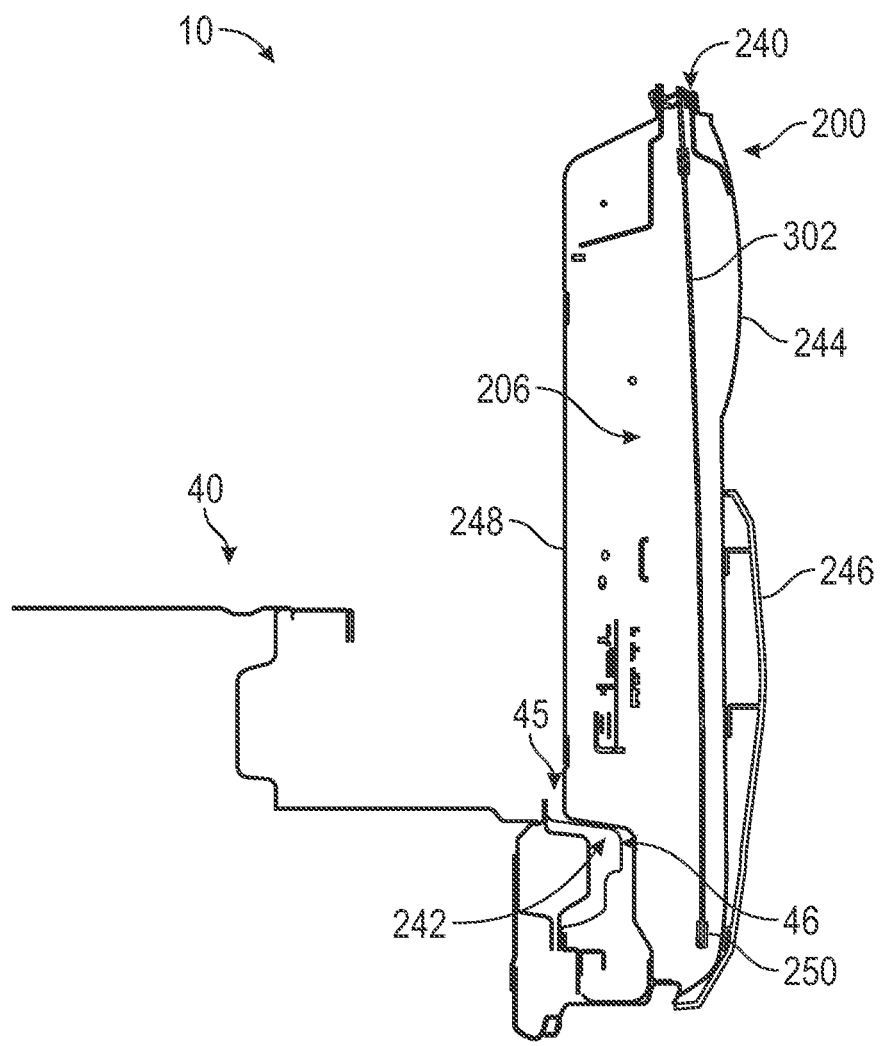
FIG. 13 is a rear view of a right side door for the cab of FIG. 11, at a lateral cross-section through the door, showing only a lower half of the door with the window configured in a retracted position.
Figure 15:
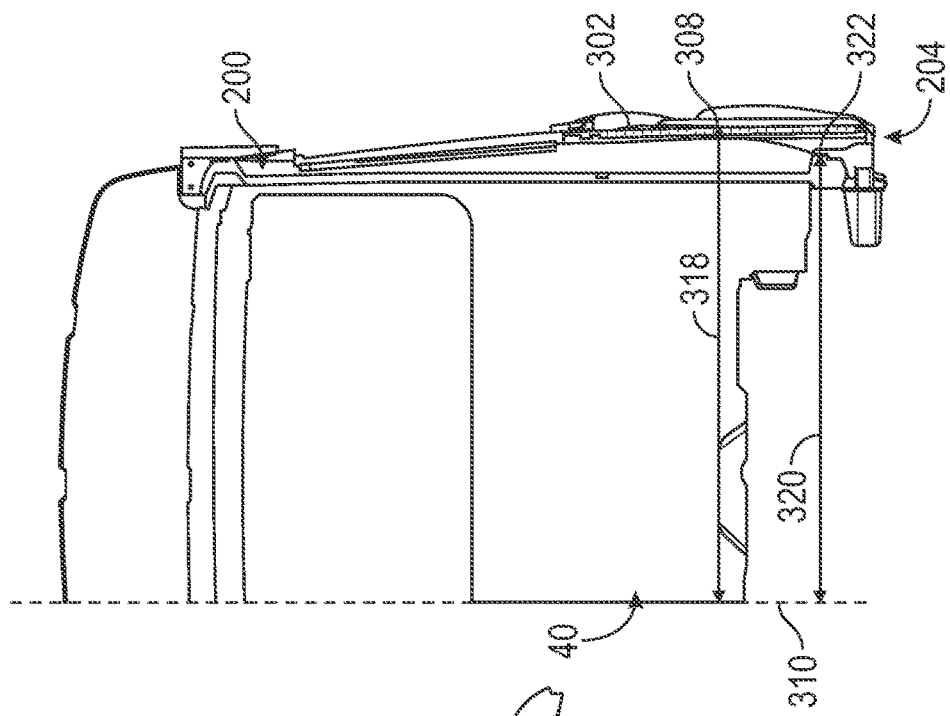
FIG. 15 is a rear cross-sectional view of the cab of FIG. 14.
Figure 14:
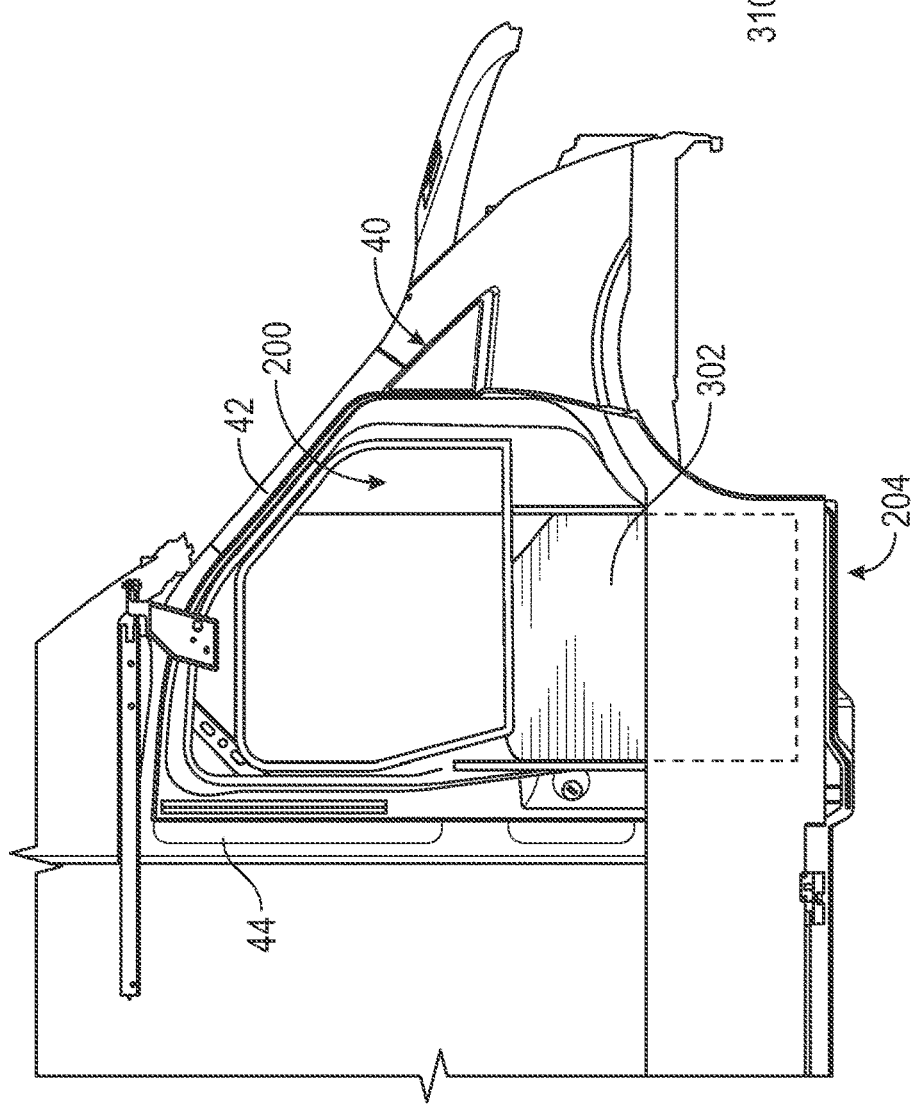
FIG. 14 is a right side view of a cab of the mail and delivery vehicle of FIGS. 1-2, with a window configured in a retracted position, according to an illustrative embodiment.

The window 302 is configured to move between an extended position, in which the window 302 is nested within the cutout 240 in the right sliding door 200 (e.g., a raised position, a closed position, etc.), and a retracted position (e.g., a lowered position, an open position), in which the window 302 is at least partially pulled away from the cutout 240 and into the interior cavity 206 of the right sliding door 200. As shown in FIG. 12, the window 302 (and therefore the first guide rail 312 and the second guide rail 314) is angled at least partially laterally with respect to an inner surface 234 of the right sliding door 200, such that the window 302 moves at least partially in a lateral direction (e.g., toward or away from the cab 40, left-to-right as shown in FIG. 12) when switched between the retracted position and the extended position. In the extended position, as shown in FIGS. 11, the window 302 fully occupies the cutout 240 and is nested within a space between the A-pillar 42 and B-pillar 44 of the cab 40. As the window 302 moves toward the retracted position (e.g., as shown in FIGS. 13-15), the window 302 is directed to a location that is outboard of the cab 40 (e.g., outboard of an external surface of at least one of the A-pillar 42 and B-pillar 44). In other words, the window 302 is disposed outboard of the A-pillar 42, the B-pillar 44, and the outer surface 46 of the cab 40 (e.g., a side wall of the cab 40 either forward or aft of the right sliding door 200) when configured in the retracted position. Among other benefits, this configuration prevents the window 302 from coming into contact with a lower structure of the cab 40 near a forward or aft side of the window 302.

FIG. 13 shows a rear cross-sectional view of the right sliding door 200 in the closed position and with the window 302 configured in the retracted position. As shown in FIG. 13, the window 302 is completely removed from the cutout 240 in order to provide full access through the cutout 240 to an occupant of the delivery vehicle 10. The window 302 is positioned outboard (e.g., in a lateral direction) from the structure of the cab 40. Specifically, the window 302 is disposed just outboard of a lower structural member 242 (e.g., an inner door panel, rocker panel, etc.) of the cab 40, which at least partially defines a lower surface of the recessed area 45 in the side of the cab 40. As shown in FIGS. 13, the window 302 is enclosed within the interior cavity 206 of the right sliding door 200 by a series of panels (e.g., panels that define the interior cavity 206), including an outer panel, shown as door skin 244, a protective panel, shown as protective trim 246, and an inner wall 248 of the right sliding door 200. As shown in FIG. 13, the inner wall 248 is coupled to the door skin 244 at the lower end of the sliding door 200. The inner wall 248 is spaced apart from (e.g., separated from) the door skin 244 to form the interior cavity 206.

The inner wall 248 of the right sliding door 200 is engaged with the cab 40 (e.g., contacts the cab 40) when the right sliding door 200 is in the closed position. The protective trim 246 is coupled to the door skin 244. The protective trim 246 may be spaced a distance from the door skin 244 to protect the door skin 244 during a collision event (e.g., the protective trim 246 functions as shielding for the door skin 244). Together, the door skin 244 and the protective trim 246 form an outer wall of the right sliding door 200.

The interior cavity 206 is at least partially disposed laterally outboard from the cab 40 (e.g., outboard from the outer surface 46 of the cab 40, outboard from a rocker panel of the cab etc.) when the right sliding door 200 is in the closed position. Correspondingly, both the door skin 244 and the protective trim 246 are configured to be disposed laterally outboard from the cab 40 when the right sliding door 200 is in the closed position (e.g., when the right sliding door 200 is received within the recessed area 45 of the cab 40). Additionally, at least a portion (e.g., a lower portion as shown in FIG. 13) of the inner wall 248 of the right sliding door 200, proximate to the lower end of the right sliding door 200, is configured to be disposed laterally outboard from the cab 40 when the right sliding door 200 is in the closed position.

In the embodiment of FIG. 13, the right sliding door 200 additionally includes a lower retaining member 250 to support the window 302, along a lower edge of the window 302, in the retracted position. The lower retaining member 250 is a clip forming a U-shaped channel configured to receive the window 302 therein. In other embodiments, the geometry and/or position of the lower retaining member 250 may be different.

In the extended position, as shown in the embodiment of FIG. 12, the window 302 is disposed proximate to an upper edge 202 of the right sliding door 200 (e.g., an upper edge of the cutout 240) at a first lateral position 306. FIGS. 14-15 show the right sliding door 200 with the windows 302 in a retracted position. In the retracted position, as shown in FIG. 15, the window 302 is disposed proximate to a lower edge 204 of the right sliding door 200 at a second lateral position 308. As shown in FIG. 12 (with the window 302 in the extended position), the first lateral position 306 is defined as a first distance 316 between a longitudinal axis 310 of the cab and a central position of the window 302 (e.g., a position centered between an upper and lower edge of the window 302). As shown in FIG. 15 (with the window 302 in the retracted position), the second lateral position 308 is defined as a second distance 318 between the longitudinal axis 310 of the cab 40 and a central position of the window 302. In an exemplary embodiment, the second distance 318 is greater than the first distance 316. The second lateral position 308 is outboard (e.g., laterally outboard) from the outer surface 46 of the cab 40. In other words, the second distance 218 is greater than a third distance 320 defining a third lateral position 322 between the longitudinal axis 310 of the cab 40 and an outer surface 46 of the cab 40 (e.g., an outermost lateral point along the rocker panel).

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

The invention claimed is:

1. A door, comprising:
an outer wall coupled with an inner wall, the outer wall spaced apart from the inner wall to form a space, wherein the door is configured to move between a closed position in which the inner wall is engaged with a cab of a vehicle and an open position in which the inner wall is separated from the cab, and wherein in the closed position at least a portion of the space is laterally outwards of a panel of the cab; and
a window assembly comprising a window coupled with the door, the window configured to move between an extended position and a retracted position, wherein in the retracted position the window is at least partially disposed in the portion of the space;
wherein the door is configured to be received at an opening of the cab that extends into an interior of the cab, wherein a portion of the window is disposed outboard from the opening proximate to at least one of a lower edge of the opening or a floor of the cab, and wherein a width of the portion of the window in a longitudinal direction is greater than a width of the opening proximate to the at least one of the lower edge of the opening or the floor of the cab.

2. The door of claim 1, wherein the window assembly further comprises:
a first track coupled to the door and disposed proximate to a rear edge of the door, wherein the first track extends between an upper end and a lower end of the door; and
a second track coupled to the door and oriented parallel to the first track, wherein the second track is disposed proximate to a forward edge of the door, wherein the window is slidably engaged to both the first track and the second track, and wherein the first track and the second track are angled at least partially laterally with respect to the inner wall.

3. The door of claim 1, wherein the door further comprises a cutout disposed proximate to an upper end of the door, and wherein a width of the door in a longitudinal direction is greater proximate to the cutout than at a lower end of the door.

4. The door of claim 1, wherein in the retracted position the window is fully disposed within the portion.

5. The door of claim 1, wherein the door further comprises a cutout disposed proximate to an upper end of the door, wherein in the extended position the window is disposed within the cutout, and wherein in the retracted position the window is at least partially pulled away from the cutout.

6. The door of claim 5, wherein in the retracted position, the window is completely removed from the cutout.

7. A vehicle, comprising:
a door coupled to a cab of the vehicle, the door comprising:
an inner wall;
an outer wall coupled to the inner wall, the outer wall spaced apart from the inner wall to form a space, wherein the door is configured to move between a closed position in which the inner wall is at least partially engaged with the cab and an open position in which the inner wall is at least partially separated from the cab, and wherein in the closed position at least a portion of the space is laterally outwards of a panel of the cab;
a window assembly comprising a window configured to move between an extended position and a retracted position, wherein in the retracted position the window is at least partially disposed in the portion of the space; and
an opening that extends into an interior of the cab, wherein the door covers the opening in the closed position, wherein a portion of the window is disposed outboard from the opening proximate to at least one of a lower edge of the opening or a floor of the cab, and wherein a width of the portion of the window in a longitudinal direction is greater than a width of the opening proximate to the at least one of the lower edge of the opening or the floor of the cab.

8. The vehicle of claim 7, wherein the window assembly further comprises:
a first track coupled to the door and disposed proximate to a rear edge of the door, wherein the first track extends between an upper end and a lower end of the door; and
a second track coupled to the door and oriented parallel to the first track, wherein the second track is disposed proximate to a forward edge of the door, wherein the window is slidably engaged to both the first track and the second track, and wherein the first track and the second track are angled at least partially laterally with respect to the inner wall.

9. The vehicle of claim 7, wherein the door further comprises a cutout disposed proximate to an upper end of the door, and wherein a width of the door in a longitudinal direction is greater proximate to the cutout than at a lower end of the door.

10. The vehicle of claim 7, wherein in the retracted position the window is fully disposed within the portion.

11. The vehicle of claim 7, wherein the door further comprises a cutout disposed proximate to an upper end of the door, wherein in the extended position the window is disposed within the cutout, and wherein in the retracted position the window is at least partially pulled away from the cutout.

12. The vehicle of claim 11, wherein in the retracted position, the window is completely removed from the cutout.

13. A vehicle, comprising:
a door coupled to a cab of the vehicle, the door comprising:
a window assembly, comprising:
a first track coupled to the door and disposed proximate to a rear edge of the door, wherein the first track extends in a direction that is substantially parallel with the rear edge;
a second track coupled to the door and oriented parallel to the first track, wherein the second track is disposed proximate to a forward edge of the door; and
a window slidably engaged to both the first track and the second track,
wherein the window is configured to move between an extended position and a retracted position, wherein in the retracted position a lower end of the window is laterally outwards from a panel of the cab; and
wherein the cab further comprises an opening that extends into an interior of the cab, wherein the door is received at the opening, wherein a portion of the window is disposed outboard from the opening proximate to at least one of a lower edge of the opening or a floor of the cab, and wherein a width of the portion of the window in a longitudinal direction is greater than a width of the opening proximate to the at least one of the lower edge of the opening or the floor of the cab.

14. The vehicle of claim 13, wherein in the extended position the lower end of the window is disposed at a first lateral position, wherein in the retracted position the lower end of the window is disposed at a second lateral position proximate to a lower end of the door, and wherein the second lateral position is farther from a longitudinal axis of the vehicle than the panel of the cab;
wherein the second lateral position is farther from the longitudinal axis of the vehicle than the first lateral position.

15. The vehicle of claim 13, wherein the door further comprises a cutout disposed proximate to an upper end of the door, and wherein a width of the door in a longitudinal direction is greater proximate to the cutout than at the lower end of the door.

16. The vehicle of claim 13, wherein the door further comprises a cutout disposed proximate to an upper end of the door, wherein in the extended position the window is disposed within the cutout, and wherein in the retracted position the window is at least partially pulled away from the cutout.

17. The vehicle of claim 16, wherein in the retracted position, the window is completely removed from the cutout.

* * * * *